(12) United States Patent
Ma et al.

(10) Patent No.: US 11,641,151 B2
(45) Date of Patent: May 2, 2023

(54) LINEAR VIBRATION MOTOR WITH ELASTIC MEMBERS WITH BRACKETS, FOAMS AND DAMPING GLUE

(71) Applicant: AAC Microtech (Changzhou) Co., Ltd., Changzhou (CN)

(72) Inventors: Jie Ma, Shenzhen (CN); Kejia Liu, Shenzhen (CN); Lubin Mao, Shenzhen (CN); Zhiyong Cui, Shenzhen (CN)

(73) Assignee: AAC Microtech (Changzhou) Co., Ltd., Changzhou (CN)

( * ) Notice: Subject to any disclaimer, the term of this patent is extended or adjusted under 35 U.S.C. 154(b) by 0 days.

(21) Appl. No.: 17/541,293

(22) Filed: Dec. 3, 2021

(65) Prior Publication Data

US 2022/0368205 A1 Nov. 17, 2022

(30) Foreign Application Priority Data

May 11, 2021 (CN) .......................... 202121002308.1

(51) Int. Cl.
*H02K 33/02* (2006.01)

(52) U.S. Cl.
CPC .................................. *H02K 33/02* (2013.01)

(58) Field of Classification Search
CPC .. H02K 7/1869; H02K 7/1876; H02K 7/1892; H02K 33/00; H02K 33/02; H02K 33/04; H02K 33/06; H02K 33/16; H02K 33/18; H02K 35/00; H02K 35/02; H02K 35/04; H02K 35/06; B06B 1/00; B06B 1/02; B06B 1/0215; B06B 1/0223; B06B 1/0269; B06B 1/0614; B06B 1/04; B06B 1/045; H02N 11/00; H02N 11/002; H02N 11/04
USPC ....... 310/25, 15, 81, 80, 321, 20, 21, 28–30, 310/36–37, 12.01–12.27, 24
See application file for complete search history.

(56) References Cited

U.S. PATENT DOCUMENTS

| | | | | |
|---|---|---|---|---|
| 4,689,973 | A | * | 9/1987 | Hershberger ......... D06F 37/304 68/23.7 |
| 4,700,096 | A | * | 10/1987 | Epars ................... H02K 1/2773 310/156.61 |
| 5,773,910 | A | * | 6/1998 | Lange .................. H02K 21/125 310/90 |
| 5,783,893 | A | * | 7/1998 | Dade ...................... H02K 16/00 310/266 |
| 6,323,572 | B1 | * | 11/2001 | Kinoshita ............ H02K 1/2766 310/156.55 |

(Continued)

*Primary Examiner* — Maged M Almawri
(74) *Attorney, Agent, or Firm* — W&G Law Group

(57) ABSTRACT

One of the objects of the present invention is to provide a linear vibration motor which improves damping performance and reduces assembly costs. Accordingly, the present invention provides a linear vibration motor having a housing body with an inner cavity; a weight accommodated in the housing body; a stator located in the housing body; and an elastic member suspending the weight in the housing body. The elastic member includes a first elastic member having a first fixed part fixedly connected to one side of the weight and a first elastic bracket extending from the first fixed part, and a second elastic member fixedly connected to an opposite side of the weight a first damping glue locating between the first elastic member and the weight, and locating at one end of the first elastic bracket close to the first fixed part.

9 Claims, 4 Drawing Sheets

(56) References Cited

U.S. PATENT DOCUMENTS

| | | | | |
|---|---|---|---|---|
| 7,262,526 B2* | 8/2007 | Shiga | | H02K 15/03 |
| | | | | 310/156.28 |
| 8,138,650 B2* | 3/2012 | Shiga | | H02K 1/2786 |
| | | | | 29/598 |
| 8,258,657 B2* | 9/2012 | Kim | | H02K 15/02 |
| | | | | 310/28 |
| 8,643,229 B2* | 2/2014 | Park | | H02K 33/16 |
| | | | | 310/15 |
| 8,878,401 B2* | 11/2014 | Lee | | H02K 33/16 |
| | | | | 310/15 |
| 9,124,161 B2* | 9/2015 | Kim | | H02K 16/00 |
| 9,748,827 B2* | 8/2017 | Dong | | H02K 33/16 |
| 9,815,085 B2* | 11/2017 | Chun | | G06F 3/016 |
| 9,912,217 B2* | 3/2018 | Xu | | H02K 33/16 |
| 10,008,894 B2* | 6/2018 | Mao | | H02K 1/34 |
| 10,076,771 B2* | 9/2018 | Xu | | H02K 33/12 |
| 10,103,614 B2* | 10/2018 | Guo | | H02K 33/18 |
| 10,284,066 B2* | 5/2019 | Huang | | H02K 1/34 |
| 10,491,067 B2* | 11/2019 | Fraser | | H02K 1/2786 |
| 10,710,115 B2* | 7/2020 | Huang | | H02K 33/02 |
| 10,797,576 B2* | 10/2020 | Wu | | H02K 33/18 |
| 11,404,948 B2* | 8/2022 | Liu | | H02K 33/16 |
| 11,515,774 B2* | 11/2022 | Yan | | H02K 33/16 |
| 2003/0227225 A1* | 12/2003 | Kaneda | | H02K 33/18 |
| | | | | 310/81 |
| 2004/0108781 A1* | 6/2004 | Razzell | | H02K 51/00 |
| | | | | 310/112 |
| 2006/0103253 A1* | 5/2006 | Shiga | | H02K 1/2786 |
| | | | | 310/43 |
| 2009/0096299 A1* | 4/2009 | Ota | | B06B 1/045 |
| | | | | 310/25 |
| 2009/0096314 A1* | 4/2009 | Atarashi | | H02K 16/02 |
| | | | | 310/156.53 |
| 2010/0213885 A1* | 8/2010 | Ichiyama | | H02K 21/12 |
| | | | | 310/156.46 |
| 2011/0006618 A1* | 1/2011 | Lee | | B06B 1/045 |
| | | | | 310/25 |
| 2011/0101797 A1* | 5/2011 | Lee | | H02K 33/16 |
| | | | | 310/29 |
| 2011/0115310 A1* | 5/2011 | Dong | | H02K 33/16 |
| | | | | 310/28 |
| 2011/0285238 A1* | 11/2011 | Kusase | | H02K 16/04 |
| | | | | 310/156.48 |
| 2011/0316361 A1* | 12/2011 | Park | | H02K 33/16 |
| | | | | 310/25 |
| 2011/0316366 A1* | 12/2011 | Abbasian | | H02K 19/103 |
| | | | | 310/46 |
| 2012/0153748 A1* | 6/2012 | Wauke | | H02K 33/16 |
| | | | | 310/25 |
| 2012/0200187 A1* | 8/2012 | Sano | | H02K 1/2766 |
| | | | | 310/156.07 |
| 2012/0228965 A1* | 9/2012 | Bang | | H02K 21/12 |
| | | | | 310/156.02 |
| 2013/0093276 A1* | 4/2013 | Kim | | H02K 16/00 |
| | | | | 310/114 |
| 2013/0270955 A1* | 10/2013 | Lillington | | H02K 1/2773 |
| | | | | 29/598 |
| 2013/0307363 A1* | 11/2013 | Sano | | H02K 1/27 |
| | | | | 310/156.01 |
| 2014/0217859 A1* | 8/2014 | Saito | | H02K 1/276 |
| | | | | 310/68 D |
| 2016/0013710 A1* | 1/2016 | Dong | | H02K 33/16 |
| | | | | 310/25 |
| 2016/0084853 A1* | 3/2016 | Baldwin | | G01N 33/74 |
| | | | | 435/6.12 |
| 2016/0226365 A1* | 8/2016 | Wang | | H02K 33/16 |
| 2017/0033672 A1* | 2/2017 | Xu | | H02K 33/16 |
| 2017/0117788 A1* | 4/2017 | Hou | | H02K 1/34 |
| 2017/0126109 A1* | 5/2017 | Hara | | H02K 33/00 |
| 2017/0341108 A1* | 11/2017 | Mao | | H02K 33/00 |
| 2017/0373574 A1* | 12/2017 | Chai | | H02K 33/00 |
| 2017/0373577 A1* | 12/2017 | Huang | | H02K 33/16 |
| 2017/0373578 A1* | 12/2017 | Wu | | H02K 33/16 |
| 2018/0026506 A1* | 1/2018 | Zhang | | H02K 33/16 |
| | | | | 310/25 |
| 2018/0071779 A1* | 3/2018 | Mori | | H02K 3/04 |
| 2018/0278137 A1* | 9/2018 | Zhu | | H02K 33/16 |
| 2018/0297061 A1* | 10/2018 | Mao | | H02K 5/04 |
| 2018/0297069 A1* | 10/2018 | Hua | | B06B 1/045 |
| 2018/0297071 A1* | 10/2018 | Xu | | B06B 1/045 |
| 2019/0036435 A1* | 1/2019 | Zhu | | H02K 33/02 |
| 2019/0207496 A1* | 7/2019 | Takahashi | | H02K 33/18 |
| 2019/0296627 A1* | 9/2019 | Takahashi | | H02K 33/18 |
| 2020/0044256 A1* | 2/2020 | Cattaneo | | H01M 4/73 |
| 2020/0044548 A1* | 2/2020 | Tang | | H02K 33/18 |
| 2020/0278750 A1* | 9/2020 | Yeon | | B06B 1/0611 |
| 2020/0389077 A1* | 12/2020 | Ma | | H02K 33/18 |

* cited by examiner

LINEAR VIBRATION MOTOR WITH ELASTIC MEMBERS WITH BRACKETS, FOAMS AND DAMPING GLUE

FIELD OF THE PRESENT DISCLOSURE

The present disclosure relates to motors, in particular to a linear vibration motor for providing tactile feedback.

DESCRIPTION OF RELATED ART

Portable electronic devices such as mobile phones, handheld game consoles, and navigation devices in the related art are becoming more and more popular. These products generally use linear vibration motors for system feedback, such as mobile phone call prompts, information prompts, navigation prompts, and vibration feedback from game consoles.

A related linear vibration motor usually includes a housing with an accommodation space, and a stator, a vibrator, and a V-shaped spring accommodated in the housing. Wherein, the vibrator includes a magnet and a weight, and the vibrator and the stator are connected by a V-shaped spring.

For related linear vibration motors, foams are arranged as damping on the side of the V-shaped spring close to the weight, and between the weight and weight. The foams are arranged to increase the damping value of the linear vibration motor. Adding foam to the V-spring of the linear vibration motor by the above method, however, will cause the V-spring to deform greatly after the foam is compressed. At the same time, the damping value provided by the foam located in the middle of the weight side is small, which cannot meet the performance requirements of the linear vibration motor.

SUMMARY OF THE PRESENT INVENTION

One of the objects of the present invention is to provide a linear vibration motor which improves damping performance and reduces assembly costs.

To achieve the above-mentioned objects, the present invention provides a linear vibration motor having a housing body with an inner cavity; a weight accommodated in the housing body; a stator located in the housing body; and an elastic member suspending the weight in the housing body. The elastic member includes a first elastic member having a first fixed part fixedly connected to one side of the weight and a first elastic bracket extending from the first fixed part, and a second elastic member fixedly connected to an opposite side of the weight a first damping glue locating between the first elastic member and the weight, and locating at one end of the first elastic bracket close to the first fixed part.

The linear vibration motor further includes a first foam between the first elastic member and the weight. The first foam locates on the same side of the first elastic bracket as the first damping glue, and locates on a side of the first damping glue away from the first fixed part.

In addition, the first elastic member further includes a second fixed part fixedly connected to an inner wall of the housing body, and a second elastic bracket extending from the second fixed part and bendingly connected with the first elastic bracket for forming a V-shape; the second fixed part is opposite to the first fixed part.

In addition, the first foam locates opposite to a middle of the first elastic bracket.

In addition, a side of the weight facing the first elastic member forms a first accommodation cavity for partially accommodating the first damping glue; the first damping glue abuts against the first elastic member. The weight forms a third accommodation cavity arranged in parallel with the first accommodation cavity for partially accommodating the first foam; the first foam abuts against the first elastic bracket.

In addition, the second elastic member locates on a side of the weight away from the first elastic member; and the linear vibration motor further includes a second damping glue connected between the second elastic member and the weight. The second elastic member includes a third fixed part fixedly connected to the weight and a third elastic bracket extending from the third fixed part; the second damping glue is arranged at one end of the third elastic bracket close to the third fixed part. A second foam is arranged on the same side as the second damping glue between the second elastic member and the weight in the abutting manner; the second foam is arranged on the side of the second damping glue away from the third fixed part.

In addition, the second elastic member further includes a fourth fixed part fixedly connected to an inner wall of the housing body, and a fourth elastic brake extending from the fourth fixed part and bending and connecting with the third elastic brake to form a V shape, and the third fixed part is arranged opposite to the fourth fixed part.

In addition, the second foam is arranged opposite to a middle of the third elastic bracket.

In addition, a side of the weight facing the second elastic member forms a second accommodation cavity for partially accommodating the second damping glue; the second damping glue abuts against the second elastic member. The weight is concavely provided with a fourth accommodation cavity arranged in parallel with the second accommodation cavity. The second foam is embedded in the fourth accommodation cavity and protrudes out of the fourth accommodation cavity. The second foam is in contact with the third elastic bracket.

In Addition, one end of the first accommodation cavity penetrates the bottom of the weight, and the other end extends toward the top of the weight to a set distance; one end of the third accommodation cavity penetrates the bottom of the weight, and the other end extends toward the top of the weight to a set distance.

In addition, one end of the second accommodation cavity penetrates the bottom of the weight, and the other end extends toward the top of the weight for forming a distance; one end of the fourth accommodation cavity penetrates the bottom of the weight and faces the inner wall of the housing body, and the other end extends toward the top of the weight for forming a distance.

BRIEF DESCRIPTION OF THE DRAWINGS

Many aspects of the exemplary embodiment can be better understood with reference to the following drawings. The components in the drawing are not necessarily drawn to scale, the emphasis instead being placed upon clearly illustrating the principles of the present disclosure.

DETAILED DESCRIPTION OF THE EXEMPLARY EMBODIMENT

The present disclosure will hereinafter be described in detail with reference to an exemplary embodiment. To make the technical problems to be solved, technical solutions and beneficial effects of the present disclosure more apparent, the present disclosure is described in further detail together with the figures and the embodiment. It should be understood the specific embodiment described hereby is only to explain the disclosure, not intended to limit the disclosure.

Figure 1:
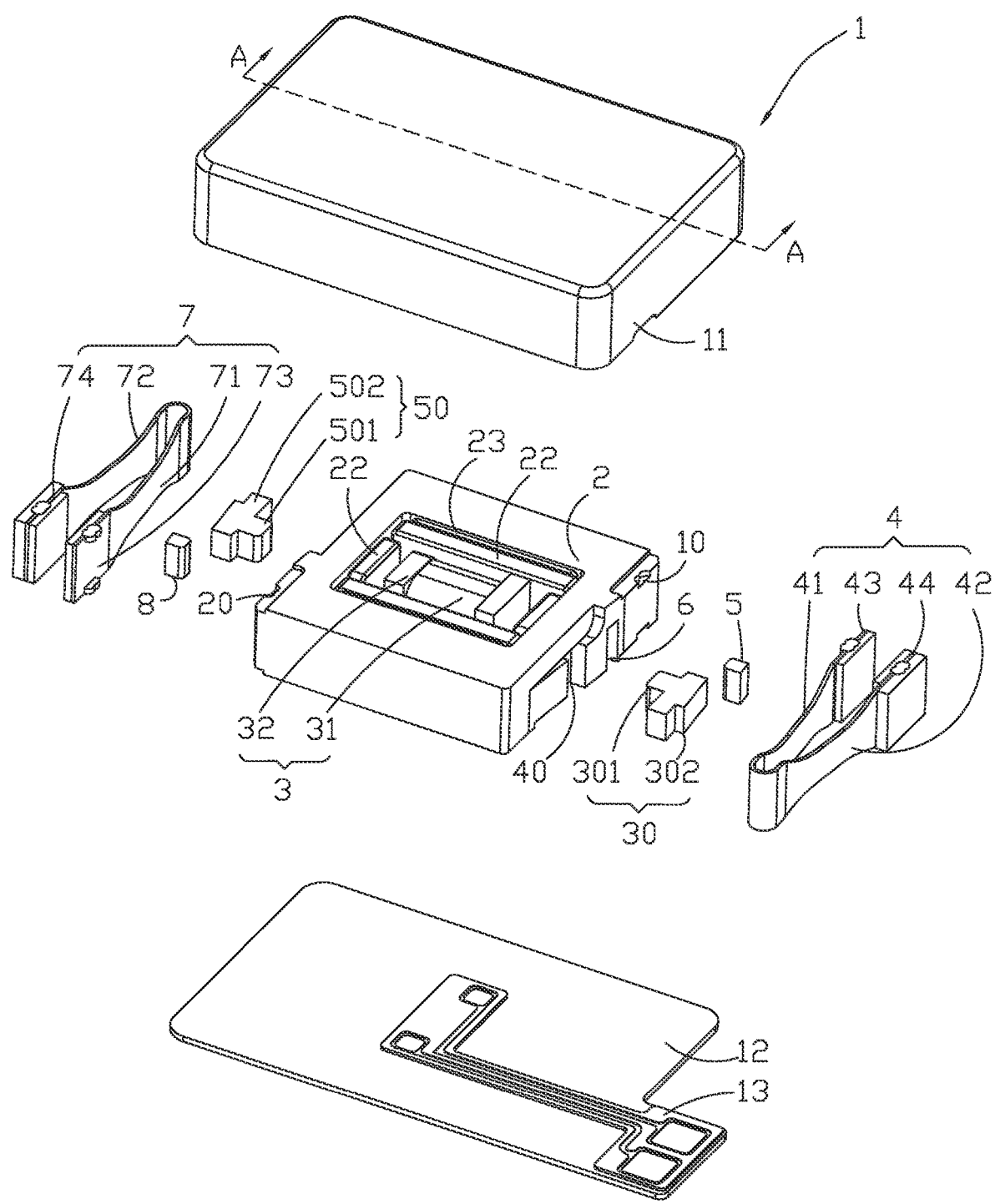
FIG. 1 is an exploded and isometric view of a linear vibration motor in accordance with an exemplary embodiment of the present invention.

As shown in FIG. 1, a linear vibration motor includes a housing body 1, a weight 2 accommodated in the housing body 1, and a stator 3 located in the weight 2, and an elastic member that suspended weight 2 in housing body 1. The elastic member includes a first elastic member 4. The first elastic member 4 is located on the side of weight 2. One end of the first elastic member 4 is connected to the end of the side wall of the weight 2, and the other end is connected to the side wall of the housing body 1. Wherein, the first elastic member 4 includes a first fixed part 43, which is fixedly connected to the side wall of the weight 2. a first elastic bracket 41 extending from the first fixed part 43, and a second fixed part 44 connected to the inner wall of the housing body 1, and a second elastic bracket 42 extending from the second fixed part 44 and bending and connecting with the first elastic bracket 41 to form a V-shape. The first fixed part 43 is fixedly connected with the weight 2 and the second fixed part 44 is fixedly connected with the inner wall of the housing body 1, so that the weight 2 can better reciprocate under the elastic abutment of the first elastic member 4.

A first damping glue 5 abuts between the side walls of the first elastic member 4 and the weight 2 in the direction close to one end of the first fixed part 43. Set first damping glue 5 so that when weight 2 is displaced in housing body 1, first damping glue 5 will cause greater mechanical damping between first elastic member 4 and weight 2. Wherein, the rigidity of the first damping glue 5 is weaker than that of the foam compared with the foam used in the prior art. Therefore, it is difficult for the elastic member to deform too much after the foam is compressed, which causes the damping value provided by the foam to become smaller. In turn, the impact on the operating frequency of the linear vibration motor is reduced. In addition, in the assembly process of the linear vibration motor, assembling the first damping glue 5 only needs to be injected and fixed. Compared with the foam assembly process in the prior art, the assembly process using the first damping glue 5 is simpler and the assembly cost is lower.

The first damping glue 5 is arranged close to the junction of first elastic bracket 41 and the weight 2. That is, first damping glue 5 is arranged close to the first fixed part 43. Because the first elastic member 4 is arranged in a V shape, a gap with an included angle is formed between the first elastic member 4 and the side wall of the weight 2. In turn, the closer to the connection, the smaller the gap. Therefore, it is difficult for the first damping glue 5 arranged near the above-mentioned connection to leak through the above-mentioned gap.

A first foam 30 abuts between the first elastic member 4 and the side wall of the weight 2. Wherein, the first foam 30 is located on the side of the first damping glue 5 away from the first fixed part 43 and is embedded on the weight 2. The embedded assembly method makes it difficult for the first foam 30 to be separated from the weight 2. In addition, first foam 30 and first damping glue 5 are set in parallel. In this way, the damping effect of the linear vibration motor can be significantly improved, making the linear vibration motor more stable.

As a specific embodiment, as shown in FIG. 1, the first foam 30 includes a first bump 301 embedded in the weight 2 and a first abutment part 302 integrally formed with the first bump 301. The first bump 301 embedded in the weight 2 is used to limit the position of the first abutment part 302 integrally formed with the first bump 301 on the side wall of the weight 2. In order to make the first foam 30 arranged between the first elastic member 4 and the side wall of the weight 2 more stable. The first abutment part 302 abuts on the middle part of the first elastic bracket 41. At the same time, the first abutment part 302 is also located in the middle of the weight 2. And the sidewall of the first abutment part 302 away from the first bump 301 abuts against the weight 2. The first abutment part 302 is arranged in the middle of the first elastic bracket 41, and the middle of the weight 2 is less rigid than the first abutment part 302 is arranged in the connection. It reduces the occurrence of deformation of the first elastic member 4 due to excessive rigidity of the first foam 30.

Figure 2:
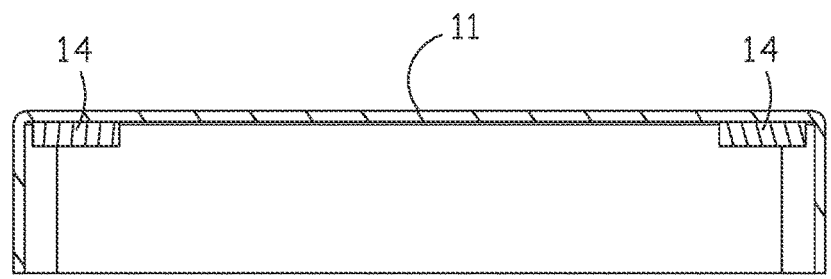
FIG. 2 is a cross-sectional view of the linear vibration motor taken along line AA in FIG. 1.

As a specific embodiment, as shown in FIG. 1, the housing body 1 includes an upper housing body 11 and a lower housing body 12 joined with the upper housing body 11. The lower housing body 12 is provided with a circuit board 13 electrically connected to the stator 3. An accommodation cavity 21 is arranged on the weight 2. The stator 3 is located in the accommodation cavity 21. A magnet 22 is provided on the peripheral wall of accommodation cavity 21. A permeable sheet 23 is provided on the sidewall of the accommodation cavity 21 parallel to the axis direction of the stator 3. The permeable sheet 23 is located between the magnet 22 and the side wall of the accommodation cavity 21. The stator 3 includes an iron core 31 fixed on the lower housing body 11 and a coil 32 wound on the iron core 31. The iron core 31 equipped with the coil 32 is located in the accommodation cavity 21. And magnet 22 is located in its circumferential direction. Wherein, as shown in FIG. 2, two position limiting sheets 14 are provided on the side wall of the upper housing body 11 facing the lower housing body 12. Effectively restrict the reciprocating position of weight 2 in housing body 1, reducing the excessive squeezing of the elastic member by weight 2 causing the elastic member to undergo elastic deformation too quickly, thereby increasing the service life of the elastic member.

Figure 3:
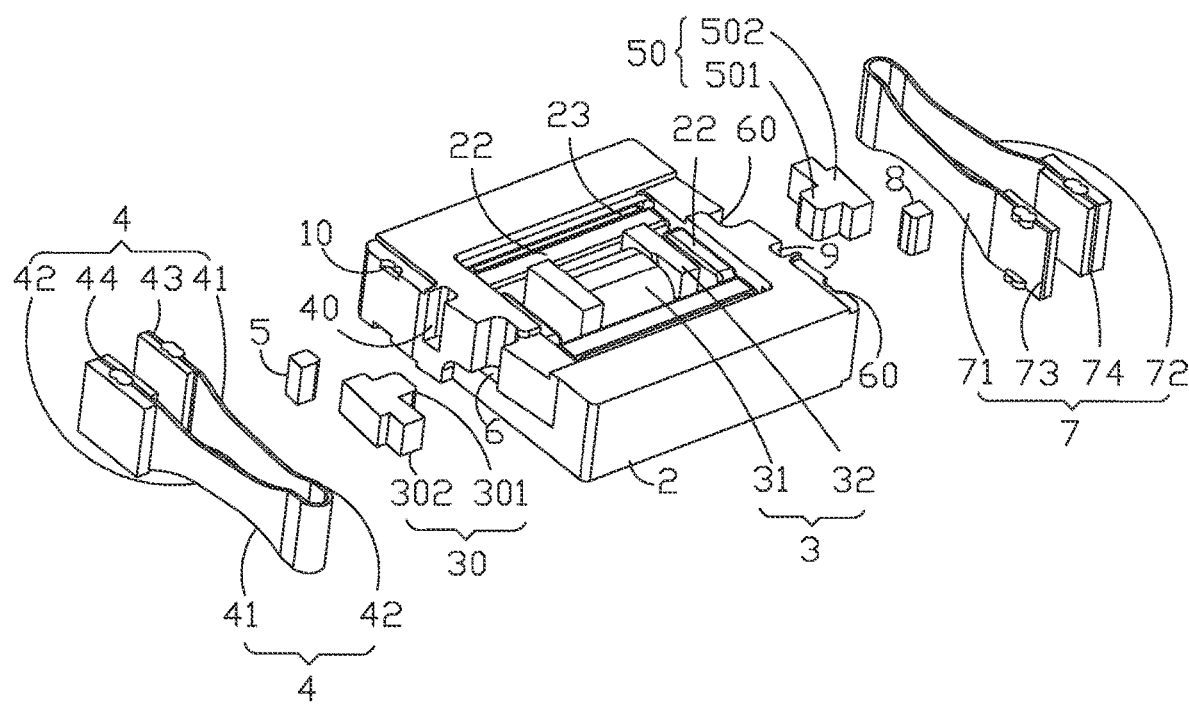
FIG. 3 is a first exploded view of a stator, a vibrator and an elastic member of the linear vibration motor.

As shown in FIGS. 1-3, the side of the weight 2 facing the first elastic member 4 is recessed with a first accommodation cavity 6 for accommodating the first damping glue 5. The first accommodation cavity 6 is arranged to accommodate the first damping glue 5 in the weight 2 to increase the volume of the first damping glue 5. In this way, the first damping glue 5 abutting between the first elastic member 4 and the weight 2 is difficult to detach from the weight 2 in the first accommodation cavity 6. It effectively reduces the occurrence of the first damping glue 5 falling off the weight 2 due to the linear vibration motor falling, shaking or falling.

Wherein, the first accommodation cavity 6 is arranged close to the junction of the first elastic member 4 and the weight 2. Place the first accommodation cavity 6 close to the joint to increase the volume of the first damping glue 5 at the joint. The first damping glue 5 can not only be set close to the gap of the above-mentioned connection, the space formed by first accommodation cavity 6 and first elastic member 4 limits the position of first damping glue 5. This makes it difficult for the first damping glue 5 to be separated from the weight 2 from the first accommodation cavity 6.

The first damping glue 5 is embedded in the first accommodation cavity 6 and one end of the first damping glue 5 protruding from the accommodation cavity abuts the first elastic member 4. The first damping glue 5 is embedded and installed in the first accommodation cavity 6, so that the first damping glue 5 can realize the self-fixing effect in the first accommodation cavity 6. The part of the first damping glue 5 protruding from the side wall of the weight 2 abuts with the first elastic member 4, so that the first damping glue 5 is difficult to detach from the first accommodation cavity 6 from the weight 2. It can effectively ensure the damping performance of the first damping glue 5, thereby reducing the impact on the operating frequency of the linear vibration motor.

As shown in FIGS. 1, 3-5, the weight 2 is also recessed with a third accommodation cavity 40 arranged in parallel with the first accommodation cavity 6. The first accommodation cavity 6 and the third accommodation cavity 40 are arranged in parallel, so that the first damping glue 5 assembled in the first accommodation cavity 6 and the first foam 30 assembled in the third accommodation cavity 40 are arranged in parallel. The first foam 30 is embedded in the third accommodation cavity 40 and protrudes out of the third accommodation cavity 40. And the first foam 30 abuts the first elastic member 41. So that the first foam 30 can realize the self-fixing effect in the third accommodation cavity 40. The part of the first foam 30 protruding from the side wall of the weight 2 abuts the first elastic member 41. It not only makes it difficult for the first foam 30 to separate from the third accommodation cavity 40 to weight 2 but also effectively ensures the damping performance of the first foam 30. In turn, the impact on the operating frequency of the linear vibration motor is reduced.

As shown in FIG. 1 and FIG. 3, elastic member also includes a second elastic member 7. Wherein, the second elastic member 7 includes a third fixed part 73 which is fixedly connected to the side wall of the weight 2, and a third elastic bracket 71 which is extended from the third fixed part 73, a fourth fixed part 74 is fixedly connected to the inner wall of housing body 1, and a fourth elastic bracket 72 that extends from the fourth fixed part 74 and bends and connects with the third elastic bracket 71 to form a V-shape. The third fixed part 73 and the fourth fixed part 74 are set opposite to each other. The third fixed part 73 is fixedly connected to the weight 2 and the fourth fixed part 74 is fixedly connected to the inner wall of the housing body 1. So that weight 2 can better reciprocate under the elastic abutment of the second elastic member 4.

The second elastic member 7 is located on the side of weight 2 away from the first elastic member 4. And one end of the second elastic member 7 is connected to the end of the side wall of the weight 2. The other end is connected with the side wall of the housing body 1 away from the first elastic member 4. A second elastic member 7 is arranged on the side of weight 2 away from the first elastic member 4 to achieve the purpose of suspending the weight 2 in the housing body 1 and reduce the friction of the weight 2 in the housing body 1.

A second damping glue 8 abuts between the side wall of the second elastic member 7 and the side wall of the weight 2 in the direction close to the end of the third fixed part 73. Set second damping glue 8 so that when the weight 2 is displaced between the first elastic member 4 and the second elastic member 7, the second damping glue 8 causes greater mechanical damping between the second elastic member 7 and the weight 2. Wherein, the rigidity of the second damping glue 8 is weaker than that of the foam compared with the foam used in the prior art. Therefore, it is difficult for the elastic member to deform too much after the foam is compressed, which causes the damping value provided by the foam to become smaller. In turn, the impact on the operating frequency of the linear vibration motor is reduced. In addition, in the assembly process of the linear vibration motor, assembling the second damping glue 8 only needs to be injected and fixed. Compared with the foam assembly process in the prior art, the assembly process using the second damping glue 8 is simpler and the assembly cost is lower.

The second damping glue 8 is arranged close to the connection between the third elastic bracket 71 of the second elastic member 7 and the weight 2. That is, the second damping glue 8 is arranged close to the third fixed part 73. Because the second elastic member 7 is arranged in a V shape, a gap with an included angle is formed between the second elastic member 7 and the side wall of the weight 2. In turn, the closer to the connection, the smaller the gap. Therefore, it is difficult for the second damping glue 8 arranged near the above-mentioned connection to leak through the above-mentioned gap.

A second foam 50 abuts between the second elastic member 7 and the side wall of the weight 2. Wherein, the second foam 50 is located on the side of the second damping glue 8 away from the third fixed part 73 and is embedded on the weight 2. The embedded assembly method makes it difficult for the second foam 50 to be separated from the weight 2. In addition, the second foam 50 and the second damping glue 8 are arranged in parallel, so that the damping effect of the linear vibration motor can be significantly improved, making the linear vibration motor more stable.

As shown in FIGS. 1, 3-5, the side of the weight 2 facing the second elastic member 7 is recessed with a second accommodation cavity 9 for accommodating the second damping glue 8. And the second accommodation cavity 9 is arranged close to the first fixed part 73. The second accommodation cavity 9 is arranged to accommodate the second damping glue 8 in the weight 2 to increase the volume of the second damping glue 8. In this way, the second damping glue 8 abutting between the second elastic member 7 and the weight 2 is difficult to detach from the weight 2 in the second accommodation cavity 9. This effectively reduces the occurrence of the second damping glue 8 falling off from the weight 2 due to falling, shaking or falling of the linear vibration motor.

The weight 2 is also concavely provided with a fourth accommodation cavity 60 arranged in parallel with the second accommodation cavity 9. The second accommodation cavity 9 and the fourth accommodation cavity 60 are arranged in parallel, so that the second damping glue 8 installed in the second accommodation cavity 9 and the second foam 50 installed in the fourth accommodation cavity 60 are installed in parallel. The second foam 50 is embedded in the fourth accommodation cavity 60 and protrudes out of the fourth accommodation cavity 60. In addition, the second foam 50 is in contact with the second elastic member 7, so that the second foam 50 can achieve a self-fixing effect in the fourth accommodation cavity 60. Moreover, the part of the second foam 50 protruding from the side wall of the weight 2 abuts with the second elastic member 7, which not only makes it difficult for the second foam 50 to separate from the fourth accommodation cavity 60 out of the weight 2, but also effectively ensures the damping performance of the second foam 50. In turn, the impact on the operating frequency of the linear vibration motor is reduced.

As a specific embodiment, as shown in FIGS. 1, 3-5, the second foam 50 includes a second bump 501 embedded in the fourth accommodation cavity 60 and a second abutment part 502 integrally formed with the second bump 501. The second bump 501 embedded in the fourth accommodation cavity 60 is used to limit the position of the second abutment part 502 integrally formed with the second bump 501 on the side wall of the weight, so as to make the second foam 50 set between the second elastic member 7 and the weight side 2 walls, the stability is better. The second abutment part 502 abuts on the middle part of the third elastic bracket 71. At the same time, the second abutment part 502 is also located in the middle of the weight 2. Besides, the sidewall of the second abutment part 502 away from the second bump 501 abuts the weight 2. The rigidity of setting the second abutment part 502 in the middle of the third elastic bracket 71 and the middle of the weight 2 is weaker than setting the second abutment part 502 in the connection. In this way, it reduces the deformation of the second elastic member 7 due to the excessive rigidity of the second foam 50, As a specific embodiment, as shown in FIGS. 1 and 3, one end of the first elastic member 4 is welded and fixed to one side of the weight 2. One end of the second elastic member 7 is welded and fixed to the side of the weight 2 away from the first elastic member 4. and the first elastic member 4 and the second elastic member 7 oppositely are set on both sides of the weight 2. Wherein, the first elastic member 4 is arranged with an opening due to its V-shaped design. In the same way, the second elastic member 7 also has openings. Wherein, the opening of the first elastic member 4 on the weight 2 is arranged opposite to the opening of the second elastic member 7. Thus, when the weight 2 moves, its stability is better than the one set in the same direction.

As shown in FIG. 1 and FIG. 3, the first damping glue 5 and the second damping glue 8 are set in a staggered manner. The staggered the first damping glue 5 and the second damping glue 8 are used to provide the moving the weight 2 with a higher damping value than the foam in the prior art. And because of the weak rigidity of the first damping glue 5 and the second damping glue 8. This makes it difficult for the greater mechanical damping provided by the first damping glue 5 and second damping glue 8 to affect the working frequency of the motor.

As shown in FIG. 1 and FIG. 3, one end of the first accommodation cavity 6 penetrates the bottom of the weight 2. The other end extends toward the top of weight 2 to a set distance. On the one hand, it is convenient to manufacture the above-mentioned first accommodation cavity 6 on weight 2. The processing technology of the first accommodation cavity 6 is simplified, and the manufacturing cost thereof is reduced. On the other hand, it is convenient to inject the first damping glue 5 set in the first accommodation cavity 6. This simplifies the assembly process of the first damping glue 5, is easy to assemble and reduces its assembly cost.

One end of the third accommodation cavity 40 penetrates the bottom of the weight 2, and the other end extends toward the top of the weight 2 to a set distance. In order to fit the first foam 30 from the third accommodation cavity 40 through the opening at the bottom of the weight 2 into the third accommodation cavity 40. This makes the assembly process of the first foam 30 to the weight 2 easier.

Figure 4:
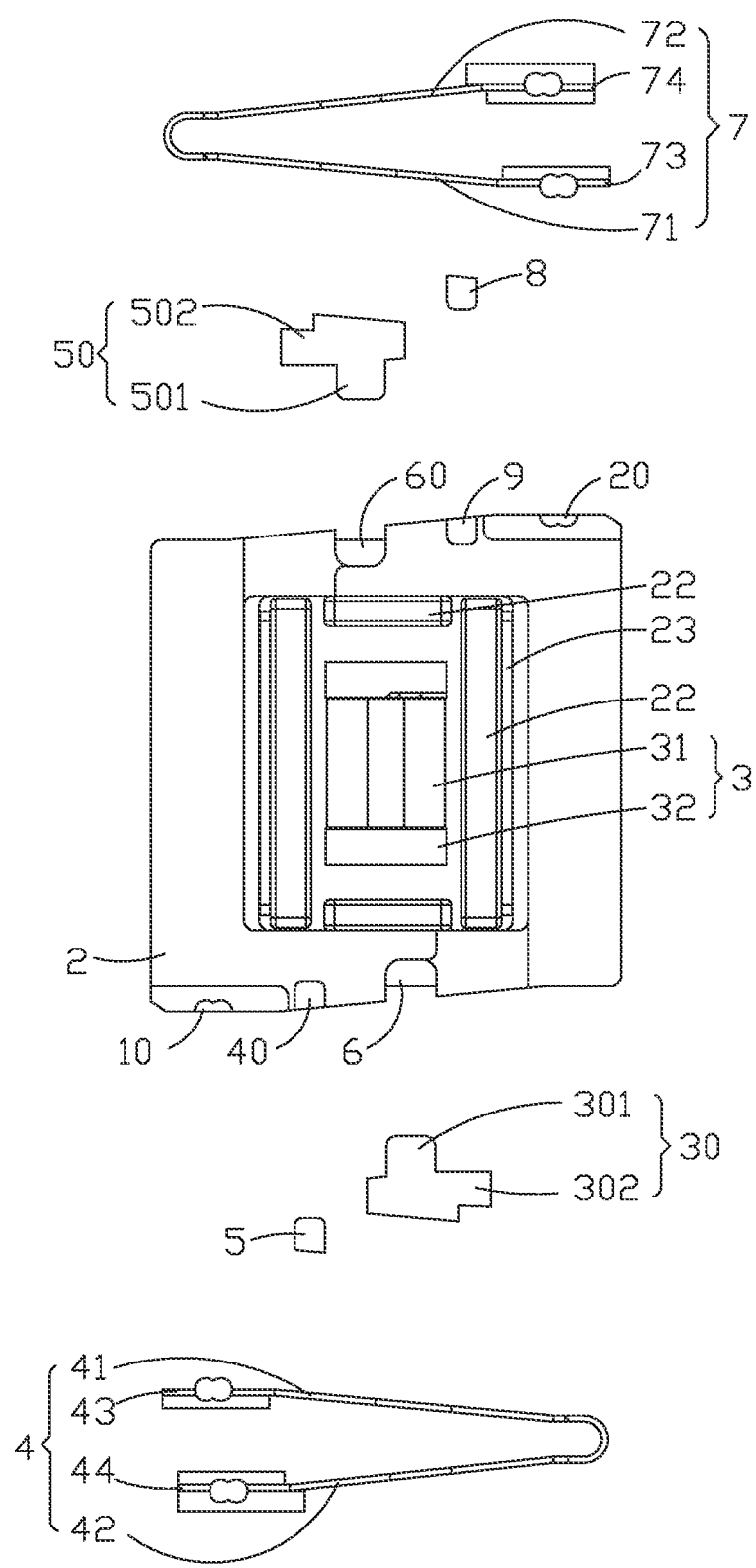
FIG. 4 is a second exploded view of the stator, the vibrator and the elastic member of the linear vibration motor.
Figure 5:
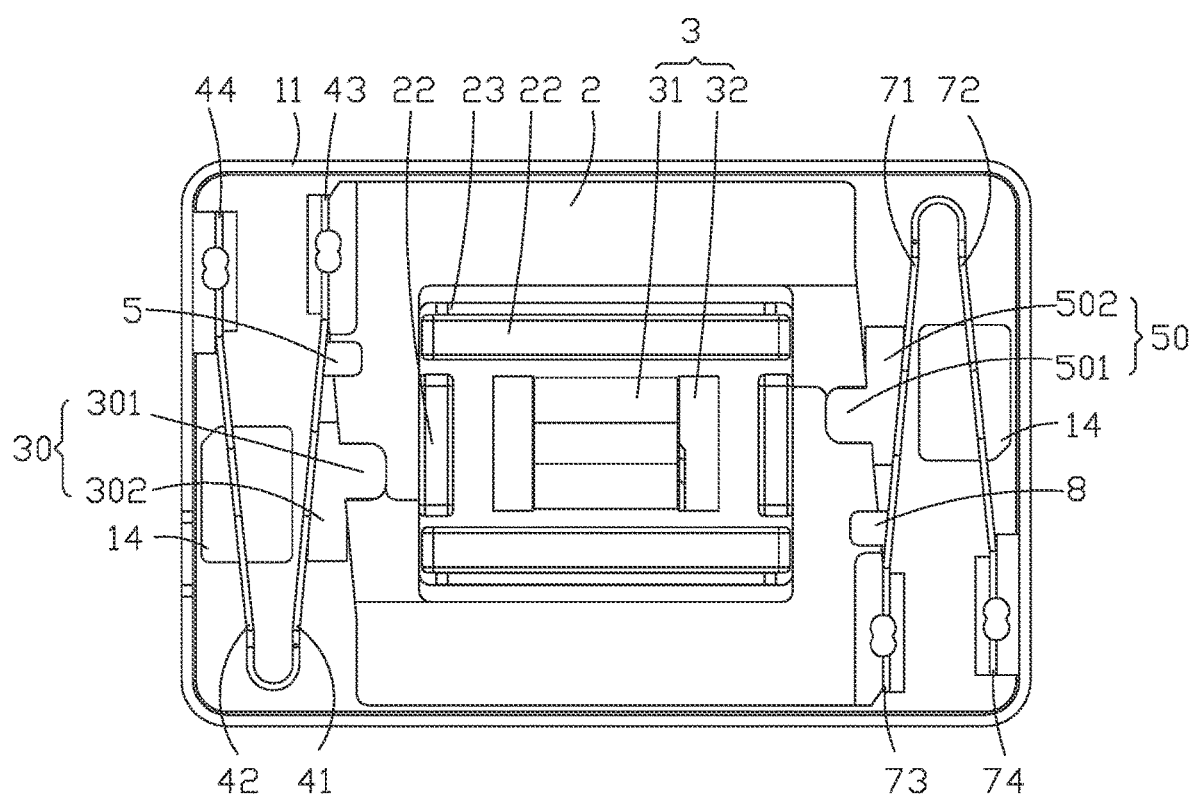
FIG. 5 is a top view of the stator, the vibrator, the elastic member and a housing body of the linear vibration motor.

As shown in FIGS. 3-5, one end of the second accommodation cavity 9 penetrates the bottom of the weight 2. The other end extends toward the top of the weight 2 to a set distance. On the one hand, it is convenient to manufacture the second accommodation cavity 9 on the weight 2. The processing technology of the second accommodation cavity 9 is simplified, and its manufacturing cost is reduced. On the other hand, it is convenient to inject the second damping glue 8 in the second accommodation cavity 9. This simplifies the assembly process of second damping glue 8, which is easy to assemble and reduces its assembly cost.

One end of the fourth accommodation cavity 60 penetrates the bottom of the weight 2, and the other end extends toward the top of the weight 1 to a set distance. In order to fit the first foam 30 from the third accommodation cavity 40 through the opening at the bottom of the weight 2 into the third accommodation cavity 40. This makes the assembly process of the first foam 30 to the weight 2 easier.

As shown in FIGS. 1, 3-5, the distance from the central axis of the first accommodation cavity 6 to the weight 2 is the same as the distance from the central axis of the second accommodation cavity 9 to the weight 2. In this way, when the weight 2 located between the first elastic member 4 and the second elastic member 7 moves, the damping on both sides is the same, thereby improving the performance of the linear vibration motor. The distance from the center axis of the third accommodation cavity 40 to the weight is the same as the distance from the center axis of the fourth accommodation cavity 60 to the weight. So that the weight 2 located between the first elastic member 4 and the second elastic member 7 has the same damping on both sides when it moves. In turn, the performance and stability of the linear vibration motor are improved.

As a specific embodiment, as shown in FIG. 1, FIG. 3 and FIG. 4, the upper and lower ends of the connection between weight 2 and first fixed part 43 are provided with first welding slots 10 for accommodating welding points. The upper and lower ends of the connection between the weight 2 and the third fixed part 73 are provided with second welding slots 20 for accommodating welding points.

It is to be understood, however, that even though numerous characteristics and advantages of the present exemplary embodiment have been set forth in the foregoing description, together with details of the structures and functions of the embodiment, the disclosure is illustrative only, and changes may be made in detail, especially in matters of shape, size, and arrangement of parts within the principles of the invention to the full extent indicated by the broad general meaning of the terms where the appended claims are expressed.

What is claimed is:

1. A linear vibration motor, including:
   a housing body with an inner cavity;
   a weight accommodated in the housing body;
   a stator located in the housing body;
   an elastic member suspending the weight in the housing body, including a first elastic member having a first fixed part fixedly connected to one side of the weight and a first elastic bracket extending from the first fixed part, and a second elastic member fixedly connected to an opposite side of the weight;
   a first damping glue locating between the first elastic member and the weight, and locating at one end of the first elastic bracket close to the first fixed part;
   a first foam between the first elastic member and the weight; wherein
   the first foam locates on the same side of the first elastic bracket as the first damping glue, and locates on a side of the first damping glue away from the first fixed part;

the first elastic member further includes a second fixed part fixedly connected to an inner wall of the housing body, and a second elastic bracket extending from the second fixed part and bendingly connected with the first elastic bracket for forming a V-shape; the second fixed part is opposite to the first fixed part.

2. The linear vibration motor as described in claim 1, wherein the first foam locates opposite to a middle of the first elastic bracket.

3. The linear vibration motor as described in claim 1, wherein a side of the weight facing the first elastic member forms a first accommodation cavity for partially accommodating the first damping glue; the first damping glue abuts against the first elastic member;

the weight forms a third accommodation cavity arranged in parallel with the first accommodation cavity for partially accommodating the first foam; the first foam abuts against the first elastic bracket.

4. The linear vibration motor as described in claim 3, wherein one end of the first accommodation cavity penetrates the bottom of the weight, and the other end extends toward the top of the weight to a set distance; one end of the third accommodation cavity penetrates the bottom of the weight, and the other end extends toward the top of the weight to a set distance.

5. The linear vibration motor as described in claim 1, wherein the second elastic member locates on a side of the weight away from the first elastic member; and the linear vibration motor further includes a second damping glue connected between the second elastic member and the weight; the second elastic member includes a third fixed part fixedly connected to the weight and a third elastic bracket extending from the third fixed part; the second damping glue is arranged at one end of the third elastic bracket close to the third fixed part; a second foam is arranged on the same side as the second damping glue between the second elastic member and the weight in the abutting manner; the second foam is arranged on the side of the second damping glue away from the third fixed part.

6. The linear vibration motor as described in claim 5, wherein the second elastic member further includes a fourth fixed part fixedly connected to an inner wall of the housing body, and a fourth elastic brake extending from the fourth fixed part and bending and connecting with the third elastic brake to form a V shape, and the third fixed part is arranged opposite to the fourth fixed part.

7. The linear vibration motor as described in claim 6, wherein the second foam is arranged opposite to a middle of the third elastic bracket.

8. The linear vibration motor as described in claim 6, wherein a side of the weight facing the second elastic member forms a second accommodation cavity for partially accommodating the second damping glue; the second damping glue abuts against the second elastic member; the weight is also concavely provided with a fourth accommodation cavity arranged in parallel with the second accommodation cavity; the second foam is embedded in the fourth accommodation cavity and protrudes out of the fourth accommodation cavity; and the second foam is in contact with the third elastic bracket.

9. The linear vibration motor as described in claim 8, wherein one end of the second accommodation cavity penetrates the bottom of the weight, and the other end extends toward the top of the weight for forming a distance; one end of the fourth accommodation cavity penetrates the bottom of the weight and faces the inner wall of the housing body, and the other end extends toward the top of the weight for forming a distance.

\* \* \* \* \*